United States Patent
Cho

(10) Patent No.: US 9,730,127 B2
(45) Date of Patent: Aug. 8, 2017

(54) HANDOVER METHOD AND APPARATUS OF ELECTRONIC DEVICE IN WIRELESS COMMUNICATION SYSTEM

(71) Applicant: Samsung Electronics Co., Ltd., Gyeonggi-do (KR)

(72) Inventor: Sungrae Cho, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 153 days.

(21) Appl. No.: 14/622,577

(22) Filed: Feb. 13, 2015

(65) Prior Publication Data

US 2015/0245263 A1  Aug. 27, 2015

(30) Foreign Application Priority Data

Feb. 21, 2014 (KR) .................. 10-2014-0019977

(51) Int. Cl.
*H04W 36/22* (2009.01)
*H04W 36/30* (2009.01)

(52) U.S. Cl.
CPC ............ *H04W 36/22* (2013.01); *H04W 36/30* (2013.01)

(58) Field of Classification Search
None
See application file for complete search history.

(56) References Cited

U.S. PATENT DOCUMENTS

| | | | |
|---|---|---|---|
| 2009/0137251 A1* | 5/2009 | Ji | H04W 36/22 455/437 |
| 2009/0163223 A1 | 6/2009 | Casey | |
| 2009/0323530 A1 | 12/2009 | Trigui et al. | |
| 2010/0075682 A1 | 3/2010 | del Rio-Romero et al. | |
| 2011/0171952 A1 | 7/2011 | Niu | |
| 2012/0106346 A1 | 5/2012 | Aguirre et al. | |
| 2012/0142357 A1* | 6/2012 | Aminaka | H04W 36/0055 455/437 |
| 2012/0270553 A1 | 10/2012 | Ha | |

(Continued)

FOREIGN PATENT DOCUMENTS

| | | |
|---|---|---|
| JP | 2011-035763 | 2/2011 |
| KR | 10-2010-0030918 | 3/2010 |

(Continued)

*Primary Examiner* — Christine Duong

(57) ABSTRACT

Disclosed are a method and an apparatus for providing a handover of an electronic device and reselection of a base station (cell) in a wireless communication system, considering load of the base station. A method for performing handovers in an electronic device of a wireless communication system includes: when a handover is required, measuring power of signals received from a serving base station and nearby base stations, and obtaining load information of the serving base station and the nearby base stations; selecting the first candidate base stations capable of performing a handover, using the measured power of the received signals; selecting the second candidate base stations capable of performing a handover, based on the load information of the first candidate base stations; and transmitting information on the power of signals received from the selected second candidate base stations and a request message for a handover to the serving base station.

17 Claims, 7 Drawing Sheets

(56) References Cited

U.S. PATENT DOCUMENTS

2013/0155847 A1* 6/2013 Li .................... H04W 24/04
                                              370/225
2013/0183980 A1  7/2013 Gao et al.
2014/0211699 A1* 7/2014 Zhou ................. H04W 48/12
                                              370/329
2015/0230141 A1* 8/2015 Zou .................. H04W 48/06
                                              455/437

FOREIGN PATENT DOCUMENTS

KR  10-2010-0085360   7/2010
KR     10-1141426     4/2012

* cited by examiner

HANDOVER METHOD AND APPARATUS OF ELECTRONIC DEVICE IN WIRELESS COMMUNICATION SYSTEM

CROSS-REFERENCE TO RELATED APPLICATION AND CLAIM OF PRIORITY

The present application is related to and claims priority from and the benefit under 35 U.S.C. §119(a) of Korean Patent Application No. 10-2014-0019977, filed on Feb. 21, 2014, which is hereby incorporated by reference for all purposes as if fully set forth herein.

TECHNICAL FIELD

The present disclosure relates generally to a method and an apparatus for providing a handover of an electronic device and reselection of a base station (cell) in a wireless communication system, and more particularly, to a method and an apparatus for providing a handover of an electronic device and reselection of a base station (cell) in a wireless communication system, considering the load of the base station.

BACKGROUND

Thanks to the rapid development of wireless communication technology, everyone can be provided with wireless communication services anytime and anywhere. In order to provide wireless communication services, the service providers have installed many base stations to be adjacent to each other between service areas or to overlap each other in some service areas. Since a multitude of base stations are positioned to be adjacent to each other or to overlap each other, the electronic device for wireless communications should perform a handover or cell-reselection according to the movement of a user or a change of environment.

Recently, the organization for standardization of wireless communication methods has researched a hierarchical cell structure, i.e., HetNet, which enables the expansion of indoor coverage at low power costs, improvement of a transmission rate, and integrated services of wired communications and wireless communications. A hierarchical cell structure requires installation of additional base stations and low power nodes to thereby secure a cell radius. However, the excessive increase in the number of base stations and low power nodes may bring about mutual interferences between the base stations and the low power nodes. The electronic device for wireless communications frequently measure the signal power from the base stations, cell-reselection, or handovers due to the increase in the number of base stations in a specific area.

SUMMARY

To address the above-discussed deficiencies, it is a primary object in the case of high density of base stations in a wireless communication system that the electronic device served in the wireless communication system should measure signals received from the base stations and report the same to the base stations for the cell-reselection or the handovers. In certain embodiments, the report message can be a large size, which interferes with communications between other electronic devices and the base stations due to power usage for transmitting the report message.

In certain embodiments, the load of the base station in the wireless communication system can abruptly increase or decrease due to frequent cell-reselection and handovers, which causes temporary disruption of communications.

An embodiment of the present disclosure provides a method and an apparatus by which an electronic device in a wireless communication system performs cell-reselection and a handover according to a load state of the base station.

In certain embodiments of the present disclosure provides a method and an apparatus which reduces the size of a report message that is provided from an electronic device served in a wireless communication system to a base station in the case of a handover or cell-reselection.

In certain embodiments of the present disclosure provides a method and an apparatus which reduces interferences due to a report message that is provided from an electronic device served in a wireless communication system to a base station in the case of a handover or cell-reselection.

In certain embodiments of the present disclosure provides a method and an apparatus by which an electronic device served in a wireless communication system creates a report message to be transmitted when performing cell-reselection or a handover according to a load state of each base station.

In accordance with certain embodiments of the present disclosure, a method for performing a handover in an electronic device of a wireless communication system includes: when a handover is required, measuring power of signals received from a serving base station and nearby base stations, and obtaining load information of the serving base station and the nearby base stations; selecting the first candidate base stations capable of performing a handover, using the measured power of the received signals; selecting the second candidate base stations capable of performing a handover, based on the load information of the first candidate base stations; and transmitting information on the power of signals received from the selected second candidate base stations and a request message for a handover to the serving base station.

In accordance with certain embodiments of the present disclosure, a method for reselecting a base station in an electronic device of a wireless communication system includes: when reselection of the base station is required, measuring power of signals received from nearby base stations, and obtaining load information of the nearby base stations; selecting the first candidate base stations capable of being reselected, using the measured power of the received signals; selecting the base stations capable of being reselected, based on the load information of the first candidate base stations; and transmitting a connection signal to the selected base stations to thereby reselect the base stations.

In accordance with certain embodiments of the present disclosure, an electronic device includes: a wireless processing unit that transmits and receives signals of a predetermined communication band to and from a base station, and measures power of signals received from the base station; a memory that stores system information including the measured power of the signals and load information of the base station; and a communication controller that, when a handover is required during the communications with a serving base station, controls the wireless processing unit to measure the power of signals received from nearby base stations and obtain load information of the nearby base stations, selects the first candidate base stations capable of performing a handover, using the measured power of the received signals, selects the second candidate base stations capable of performing a handover, based on the load information of the first candidate base stations, creates power information of signals received from the second candidate base stations and a request message for a handover, and transmits the created power information of signals received from the selected second candidate base stations and the request message for a handover to the serving base station.

In accordance with certain embodiments of the present disclosure, the communication controller of the electronic device, when reselection of the base station is required, measures power of signals received from nearby base stations, obtains load information of the nearby base stations, selects the first candidate base stations capable of being reselected, using the measured power of the received signals, selects the base stations capable of being reselected, based on the load information of the first candidate base stations, and controls the wireless processing unit to transmit a connection signal to the selected base stations.

According to various embodiments of the present disclosure, the electronic device in a wireless communication system performs cell-reselection and a handover according to a load state of the base station, and the size of a report message that is provided to the base station in the case of a handover or cell-reselection can be reduced. Various embodiments of the present disclosure prevent excessive handovers or cell-reselection. Furthermore, various embodiments of the present disclosure reduce interferences due to a report message that is provided from the electronic device to the base station in the case of a handover or cell-reselection.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
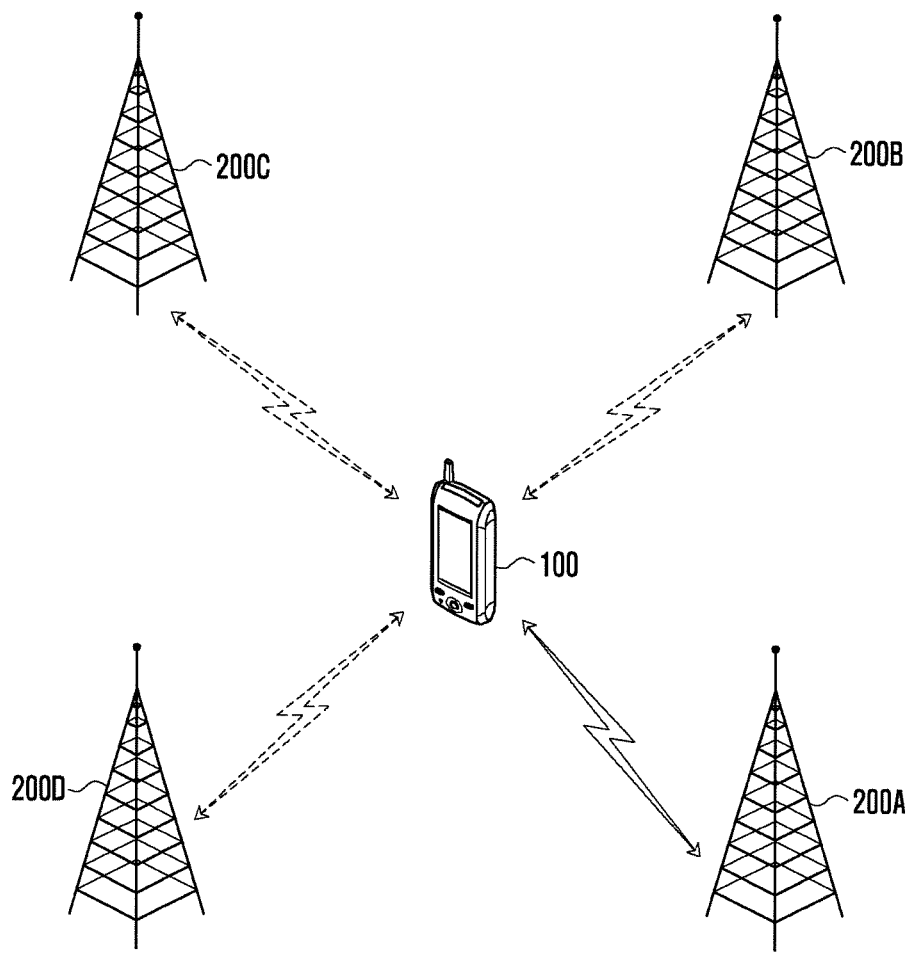
FIG. 1 illustrates a system including an electronic device served in a wireless communication system and a plurality of nearby base stations according to embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

As used herein, the expression "include" or "may include" refers to the existence of a corresponding function, operation, or element, and does not exclude one or more additional functions, operations, or elements. Also, as used herein, the terms "include" or "have" should be construed to denote a certain feature, number, step, operation, element, component or a combination thereof, and should not be construed to exclude the existence or possible addition of one or more other features, numbers, steps, operations, elements, components, or combinations thereof.

Also, as used here, the expression "or" includes any or all combinations of words enumerated together. For example, the expression "A or B" can include A, can include B, or can include both A and B.

In the present disclosure, the expressions "a first", "a second", "the first", "the second", and the like can modify various elements, but the corresponding elements are not limited by these expressions. For example, the above expressions do not limit the sequence and/or importance of the corresponding elements. The above expressions can be used merely for the purpose of distinguishing one element from the other elements. For example, a first user device and a second user device indicate different user devices although both of them are user devices. For example, a first element can be termed a second element, and similarly, a second element can be termed a first element without departing from the scope of the present disclosure.

When an element is referred to as being "coupled" or "connected" to any other element, it should be understood that not only the element can be directly coupled or connected to the other element, but also a third element can be interposed between. Contrarily, when an element is referred to as being "directly coupled" or "directly connected" to any other element, it should be understood that no element is interposed between.

The teens used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

An electronic apparatus, according to certain embodiments of the present disclosure, is an apparatus having a communication function. For example, the electronic device includes at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to some embodiments, an electronic device is a smart home appliance with a communication function. The smart home appliance, as an example of the electronic device, includes at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (such as SAMSUNG HOME SYNC® box, APPLE TV® box, or GOOGLE TV® box), a game console, an electronic dictionary, an electronic key, a camcorder, and an electronic picture frame.

According to some embodiments, the electronic device can include at least one of various medical appliances (such as magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (such as ship navigation equipment and a gyrocompass), avionics, security equipment, a vehicle head unit, an industrial or home robot, an automatic teller machine (ATM) of a banking system, and a point of sales (POS) of a shop.

According to certain embodiments, the electronic devices includes at least one of furniture or a part of a building/structure having a communication function, electronic boards, electronic signature receiving devices, projectors, or various measuring equipment (e.g., equipment for a water supply, an electricity, gases or radio waves). The entity according to the present disclosure can be a combination of one or more of the above-mentioned various devices. Also, the entity according to the present disclosure can be a flexible device. Further, it will be apparent to those skilled in the art that the entity according to the present disclosure is not limited to the above-mentioned devices.

Hereinafter, an electronic device according to various embodiments of the present disclosure is described with reference to the accompanying drawings. The term "user" as used in various embodiments refers to a person who uses an electronic device or a device (such as an artificial intelligence electronic device) that uses an electronic device.

FIG. 1 illustrates a system including an electronic device served in a wireless communication system and a plurality of nearby base stations according to various embodiments of the present disclosure.

Referring to FIG. 1, a single electronic device 100 and four nearby base stations 200A, 200B, 200C, and 200D are illustrated. The electronic device 100 communicates with the base stations in a wireless communication method supported by the base stations. The different nearby base stations 200A, 200B, 200C, and 200D use the same wireless communication method or different wireless communication methods. For example, entire base stations 200A, 200B, 200C, and 200D are based on a wireless communication system of LTE. Alternatively, some of the base stations 200A, 200B, 200C, and 200D adopt LTE communications, while the others adopt the third generation (3G) wireless communication system. Although four base stations 200A, 200B, 200C, and 200D are illustrated in FIG. 1, more or less base stations can be provided. When the base stations that are sectored, sectors of the base stations can be recognized as different base stations.

Although the nearby base stations perform wireless communications with the electronic device 100, the base stations can be replaced with various communication bases, such as LTE base stations, 3G base stations, or Wi-Fi access points, as set forth above. Various embodiments of the present disclosure described below refer to different types of base stations that support handovers of the electronic device 100 between them in order to explain handovers and cell-reselection of the electronic device. Hereinafter, for the convenience of explanation, the entire base stations 200A, 200B, 200C, and 200D perform the same wireless communication, for example, LTE.

In certain embodiments, the electronic device 100 is in a state capable of receiving signals from some of the base stations, all of the base stations, or a single base station. Although the electronic device 100 is in a state capable of receiving signals from a plurality of base stations, the electronic device 100 receives signals from only one base station during voice or data services except for handovers. When a signal received from a specific base station connected with the electronic device 100 exceeds a predetermined critical value in an idle state, the electronic device 100 ignores or does not process signals received from other base stations, except for the signal received from the corresponding base station, even though the electronic device 100 is within in the coverage thereof.

According to various embodiments of the present disclosure, operations of the base stations and the electronic device in order to support cell-reselection or handovers in the communication environment as shown in FIG. 1 are described. The term "cell" refers to an area where the electronic device receives signals from one base station. Accordingly, the cell can be considered to be the same as the base station. When the base station includes two or more sectors, the cell can be one sector. Hereinafter, different sectors mean different base stations and a cell is regarded as a base station. Therefore, the cell-reselection can be regarded as reselection of a base station or as reselection of a sector in a specific base station.

In certain embodiments, the base station continuously or periodically broadcasts a message or information including a reference signal for informing the communication area of the base station. The message or information including the reference signal includes biasing offset information for cell-reselection or a handover of an electronic device that is positioned at the cell boundary area of the nearby base station. Alternatively, the biasing offset information for cell-reselection or a handover of an electronic device that is positioned at the cell boundary area of the nearby base station broadcasts as a separate message or information.

The base station, according to various embodiments of the present disclosure, broadcasts current load information and optimum load information of the base station. The current load information and the optimum load information of the base station include different types of system information according to the communication method of the base station. For example, in the case of an LTE system, the current load information and the optimum load information of the base station is structured in System Information Block Type 2 (SIB Type 2), which is one piece of system information to be thereby transmitted. In the case of another base station that uses a different wireless communication method, the current load information and the optimum load information of the base station transmit according to the corresponding wireless communication method. If the corresponding wireless communication method does not provide the current load information and the optimum load information of the base station, the current load information and the optimum load information of the base station are defined as a new message type for broadcasting to be thereby broadcast.

In certain embodiments, the base station communicates with the nearby base station, and a handover and cell-reselection of the electronic device are provided through such communications. For example, if a handover of a specific electronic device is required, the data service provided to the corresponding electronic device is transferred to the nearby base station. The base station that receives a request for a handover of the specific electronic device takes over the service and performs communications with the corresponding electronic device by setting a wireless channel.

In certain embodiments, if cell-reselection is requested by the electronic device in an idle state, the base station performs the operation corresponding to the cell-reselection. The operation set forth above will be described in more detail with reference to a block diagram of the base station and a control flowchart of the base station later.

Next, the operation of the electronic device 100 will be described. The electronic device 100 receives signals that are broadcast by one or more base stations. The signals received by the electronic device 100 includes the message or the information including a reference signal for informing the communication area of the base station, the biasing offset information for the cell-reselection or the handover, and the current load information and the optimum load information of the base station, as set forth above.

In certain embodiments, when the cell-reselection is required, the electronic device 100 perform is a process for the cell-reselection and performs a process for making a request to the reselected base station for a connection. When the handover is required, the electronic device 100 performs a handover using information received from the base stations according to various embodiments of the present disclosure. For example, the electronic device 100 selects the base stations that are to perform a handover or reports information on the base stations capable of performing a handover, according to the current load information and the optimum load information of the base station, which are broadcast by the base station. After that, the electronic device 100 performs a handover in response to handover information provided from the base station.

In certain embodiments, the electronic device 100 performs a handover or cell-reselection with respect to the base station that has the lowest load, based on the current load information and the optimum load information as well as power of the signal received from the base station. The handover and the cell-reselection are performed in a probabilistic method in order to prevent many electronic devices from performing handovers or cell-reselection with respect to the base station having the lowest load. In the case of a handover, the base station is selected in a probabilistic method based on the load information of the base station as well as the received signal power, so a small amount of information on the received signal power is provided to the serving base station. Adopting such a probabilistic method prevents the load from abruptly increasing in a specific base station, which allows optimization of the load balance of the base stations.

The operation of the electronic device 100 set forth above will be described in more detail with reference to a block diagram of the electronic device and a control flowchart of cell-reselection or handovers of the electronic device later.

Figure 2:
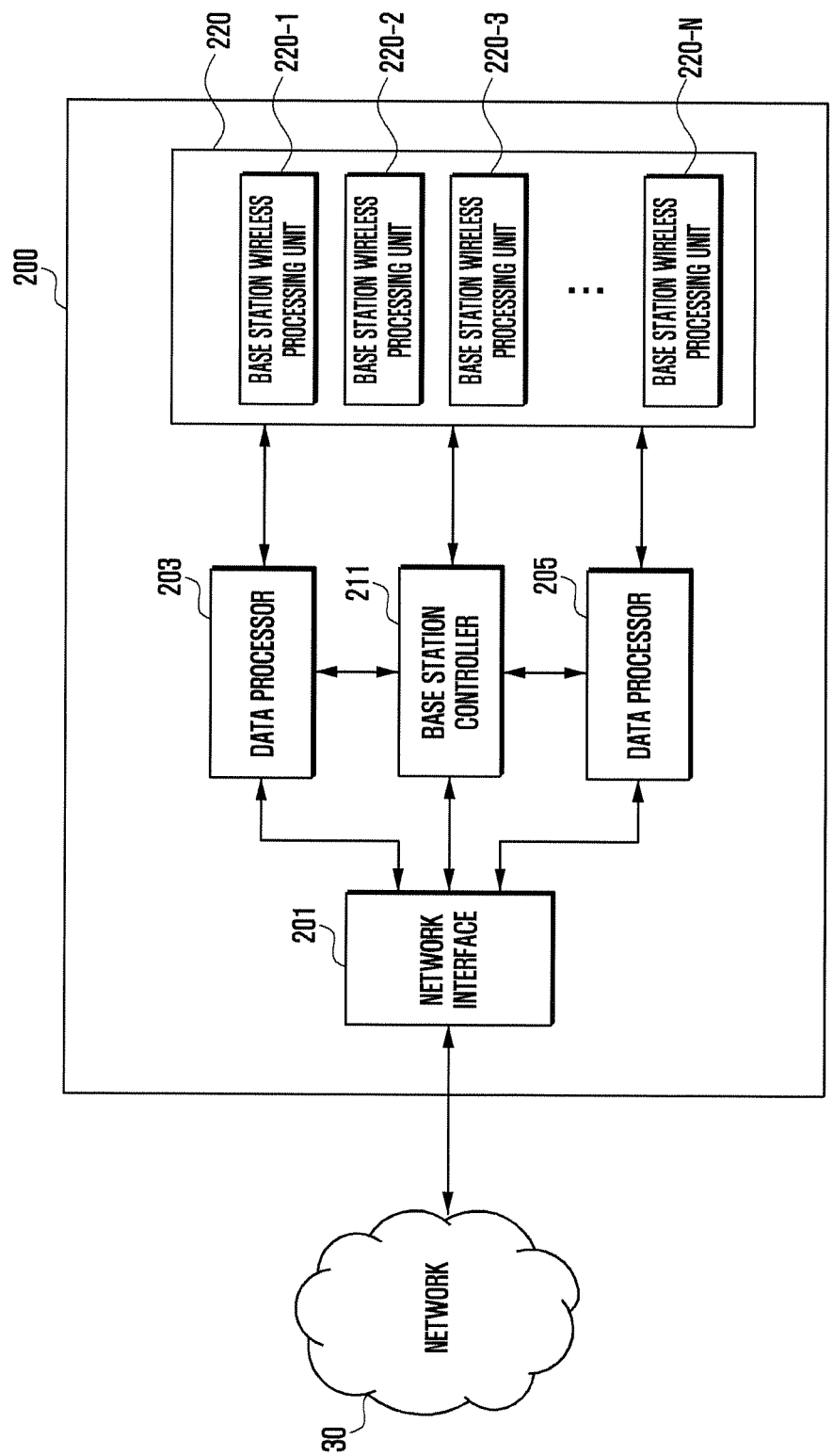
FIG. 2 illustrates a block diagram of a base station for providing information by which an electronic device performs cell-reselection or a handover according to various embodiments of the present disclosure.

FIG. 2 illustrates a block diagram of a base station 200 for providing information by which an electronic device performs cell-reselection or a handover according to various embodiments of the present disclosure. FIG. 2 illustrates a base station 200 that represents the base stations 200A, 200B, 200C, and 200D of FIG. 1, and the configuration and operation of the base station 200 will be described.

Referring to FIG. 2, the base station 200 includes a network interface 201, a base station controller 211, a data processor 203, a base station memory 205, and a base station wireless transmitting/receiving unit 220. The base station 200 receives data from a network 30, which is to be provided to a specific electronic device, and communicates with a nearby base station through the network 30.

The network interface 201 processes data to be transmitted or received between the base station 200 and upper-layered networks. For example, when data is received from the network 30, the network interface 201 transforms the data into a form that can be processed by the base station 200, and provides the transformed data to the data processor 203, the base station controller 211, or the base station memory 205. The network interface 201 processes data according to the type of network 30 and then transmits the processed data to a specific server, node, or electronic device through the network 30. A single network interface 201 is provided in the case of a single network, but can also operate to correspond to two or more networks. In the case of two or more networks, two or more network interfaces corresponding to each network can be provided.

The data processor 203 processes data created by the base station 200 or data received from a specific electronic device and transmitted to a specific server or other electronic devices, in order to transmit the data through the network 30. The data processor 203 processes data, for example, processes data as a packet, encodes data, decodes data, or modulates data, which is received from the network interface 201, in order to provide the same to a specific electronic device.

The base station memory 205 stores control data necessary for the operation of the base station 200. For example, the base station memory 205 includes an area for storing control data for performing communications between a specific electronic device and the base station, data for controlling handovers, biasing offset data corresponding to a critical value to detect the deviation from the base station area, current load information of the base station, or optimum load information of the base station. The base station memory 205 includes an area for buffering data to be provided to a specific electronic device and data to be transmitted to the network through the network interface 201. Although it looks like data-recording and data-reading is impossible between the data processor 203 and the base station memory 205 in the drawing, the base station memory 205 includes an area for storing data that is temporarily created in the data processor 203 or data that needs to be buffered and connects with the data processor 203 directly or by a bus.

The base station controller 211 controls wireless communications with electronic devices based on the control data stored in the base station memory 205 and checks the load of the base station every predetermined unit time or continuously. Furthermore, the base station controller 211 controls transmission of reference data to inform the base station area. The operation of the base station controller 211 according to various embodiments of the present disclosure will be described later.

The base station wireless transmitting/receiving unit 220 includes a plurality of base station wireless processing units 220-1, 220-2, 220-3 to 220-N. The base station wireless processing units 220-1, 220-2, 220-3 to 220-N transmit and receive data to and from one or more electronic devices in a predetermined wireless communication method. Two or more base station wireless processing units 220-1, 220-2, 220-3 to 220-N, included in the base station wireless transmitting/receiving unit 220, transmit and receive data to and from a single electronic device in a predetermined wireless communication method.

Figure 3:
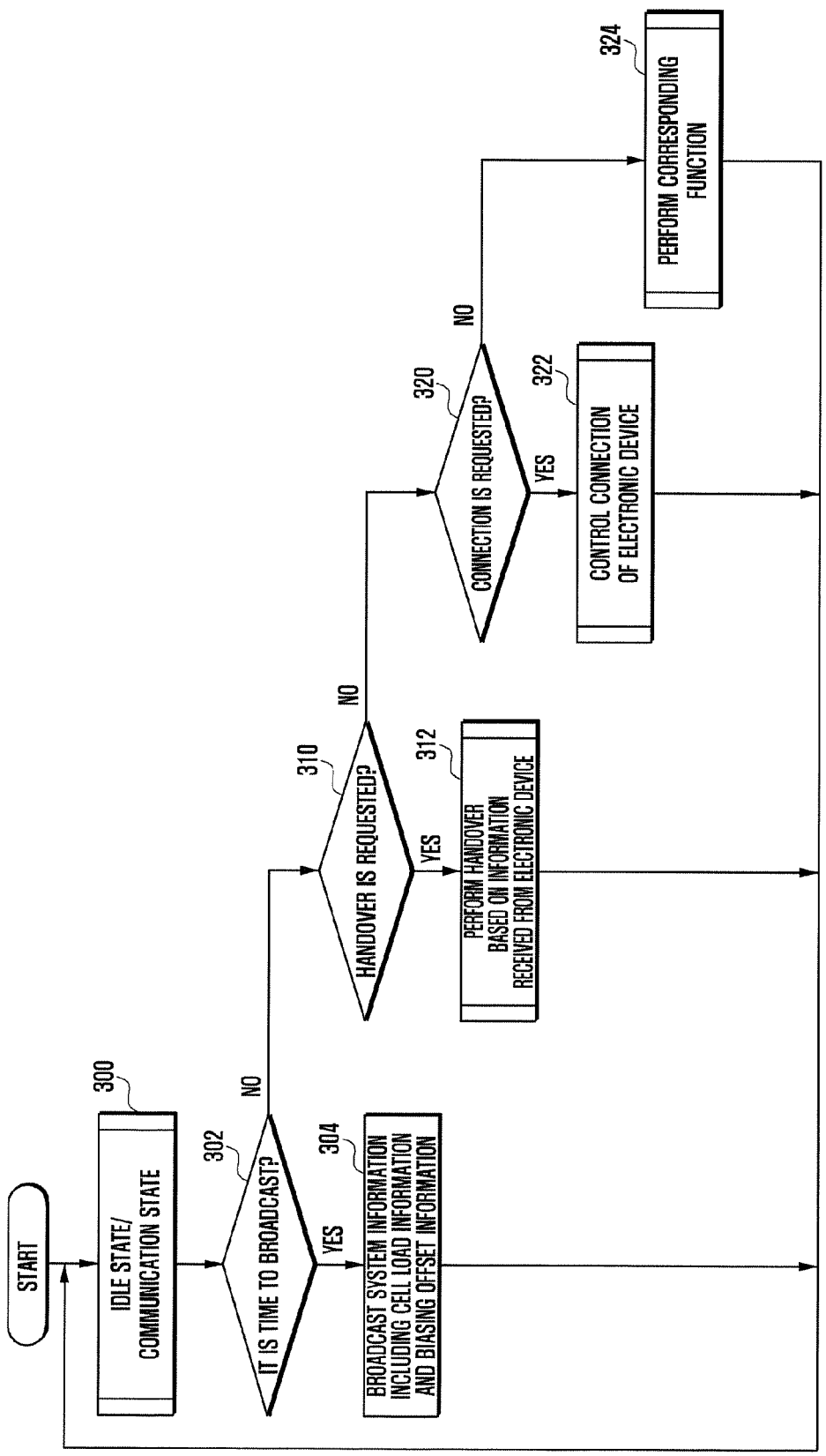
FIG. 3 illustrates a process for control of handovers or cell-reselection and data broadcast in a base station according to various embodiments of the present disclosure.

FIG. 3 illustrates a process for control of handovers or cell-reselection and data broadcast in a base station according to various embodiments of the present disclosure. For the convenience of explanation, the base station 200 periodically transmits system information every predetermined unit time. However, the base station 200 transmits system information continuously or irregularly according to wireless communication methods.

In operation 300, the base station controller 211 is in an idle state or in a communication state. In certain embodiments, the idle state refers to a state in which the base station controller 211 is waiting for various events, such as a request for an incoming call to a specific electronic device, a request for an outgoing call from a specific electronic device, a request for a handover, timing of broadcasting system information, or a request for a connection of a specific electronic device. The communication state refers to a state in which the base station forms a wireless channel with a specific electronic device to thereby perform voice or data communications.

In operation 302, the base station controller 211 checks whether it is time to broadcast system information when an event is received. If it is time to broadcast system information as result of checking in operation 302, the base station controller 211 proceeds to operation 304 to make a control to broadcast system information including biasing offset information.

For example, the base station controller 211 controls the data processor 203 to process the system information as a form to be broadcast, and controls one of the base station wireless processing units of the base station wireless transmitting/receiving unit 220 to broadcast the same. The cell load information includes current load information of the base station and optimum load information of the base station, and the biasing offset information is configured as a value by which the electronic device should perform a handover or cell-reselection according to the signal power received from the base station or the interferences. For example, the biasing offset information is configured as a value that defines the boundary area of cell edges and the nearby base station.

The base station controller calculates the current load state of the base station according to Equation 1 as follows.

$$\text{Cell load} = E[\text{the number of active electronic devices}/\text{the maximum number of electronic devices that can be accepted by base station}] \quad \text{Equation 1}$$

In certain embodiments, "the number of active electronic devices" in Equation 1 refers to the number of electronic devices that are currently on activation among the electronic devices connected to the corresponding base station, and "E[x]" means averaging of "x" and represents the number of active electronic devices. Although Equation 1 is based on the number of electronic devices, it can be based on the amount of data traffic, the number of allotted channels, or the amount of allotted power. In certain embodiments, Equation 1 is based on a combination of the number of electronic devices, the amount of data traffic, the number of allotted channels, or the amount of allotted power.

In operation 310, when the event is not related to the time for broadcasting in operation 302, the base station controller 211 determines whether or not a request for a handover is received from a specific electronic device. For example, when the electronic device, which communicates with the base station 200 by a wireless resource allotted from the base station 200, receives a signal less than a biasing offset value from the base station 200, the request for a handover is made.

In operation 312, when the request for a handover is received, the base station controller 211 proceeds to perform a handover based on information received from the electronic device requesting the handover, which includes, for example, information on signal power received by the electronic device from each base station. In certain embodiments, the handover operation of the base station is identical or similar to the general operation of the base station, and the operation of requesting a handover by the electronic device will be described in detail with reference to the following figures.

In operation 320, when the request for a handover is not received as a result of the determination in operation 310, the base station controller 211 determines whether a request for a connection is received. When the electronic device is turned on, the electronic device requests a connection with an optimum base station. In certain embodiments, the electronic device in the idle state, which is connected with other electronic device, makes a request to the current base station for a connection according to a movement or a change in the channel environment. The request for a connection can be made in various cases.

In operation 322, when the request for a connection is received as a result of the determination in operation 320, the base station controller 211 approves or refuses the connection of the corresponding electronic device. When the connection of the electronic device is approved, the base station controller 211 maintains the connection state of the electronic device.

In operation 324, when the request for a connection is not received as a result of the determination in operation 320, the base station controller 211 performs a corresponding function. The base station controller 211 performs various functions, such as a request for an outgoing call of a specific electronic device, a request for an incoming call to a specific electronic device, or transmission of push messages to a specific electronic device.

The operation set forth above can be performed in the environment of frequency division multiple access (FDMA), orthogonal frequency division multiple access (OFDMA), or code division multiple access (CDMA). However, in the case of severe interferences due to close distances between the base stations, an exclusive time slot resource allotment method based on time division multiple access (TDMA), such as almost blank subframe (ABS) of enhanced intercell interference cancellation (eICIC), can be additionally applied. In certain embodiments, when allotting the exclusive time slot resource in the case of a multitude of users, more time slots can be allotted considering the base station load indicator as described above, and the determined time slot pattern is shared with the nearby interfering base station to thereby attain exclusive transmission.

Figure 4:
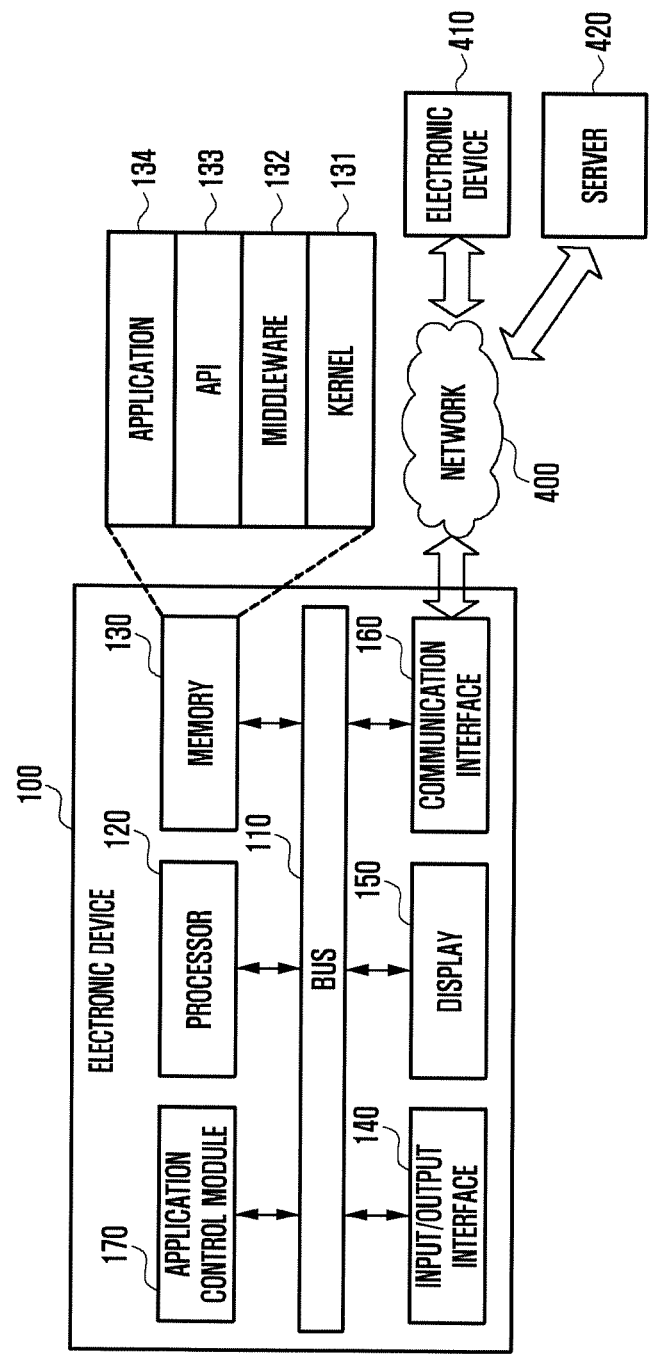
FIG. 4 illustrates a network environment including an electronic device according to various embodiments of the present disclosure.

FIG. 4 illustrates a network environment including an electronic device 100 according to various embodiments of the present disclosure. The electronic device 100 includes a bus 110, a processor 120, a memory 130, an input/output interface 140, a display 150, a communication interface 160, and an application control module 170.

The bus 110 is a circuit for connecting the elements mentioned above with each other and transferring communication data (e.g., control messages) between the elements.

The processor 120 receives instructions from other elements (such as the memory 130, the input/output interface 140, the display unit 150, the communication interface 160, or the application control module 170) through, for example, the bus 110, then decodes the received instructions and performs calculation or data processing according to the decoded instructions.

The memory 130 stores instructions or data that is received from the processor 120 or other elements (such as the input/output interface 140, the display unit 150, the communication interface 160, the application control module 170, or the like), or created by the processor 120 or other elements. The memory 130 includes programming modules such as, a kernel 131, a middleware 132, an application programming interface (API) 133, or applications 134. Each of the programming modules are configured by software, firmware, hardware, or a combination thereof. According to certain embodiments of the present disclosure, the memory 130 stores control data for controlling the operation of a handover or cell-reselection. When the electronic device 100 is turned on, the control data for controlling the operation of a handover or cell-reselection, which is stored in the memory 130, is loaded in the corresponding device.

The kernel 131 controls or manages system resources (such as the bus 110, the processor 120, the memory 130, or the like) that are used in performing operations or functions implemented by other programming modules, for example, the middleware 132, the API 133 or the applications 134. Furthermore, the kernel 131 provides an interface by which the middleware 132, the API 133 or the applications 134 access each element of the electronic device 100 for control or management.

The middleware 132 plays the intermediate role between the API 133 or the applications 134 and the kernel 131 to communicate with each other for transmission and reception of data. Furthermore, in relation to requests for operation received from the applications 134, the middleware 132 controls (such as scheduling or load-balancing) the requests, for example, by giving priority for using system resources (such as the bus 110, the processor 120, the memory 130, or the like) of the electronic device 100 to at least one of the applications 134.

The API 133 is an interface by which the applications 134 controls functions provided from the kernel 131 or the middleware 132, and includes, for example, at least one interface or function (such as instructions) for file control, window control, image processing, or text control.

According to various embodiments, the applications 134 include a short message service (SMS) or multimedia message service (MMS) application, an e-mail application, a calendar application, an alarm application, a health care application (such as an application for measuring the amount of exercise or blood sugar), an environmental information application (such as an application for providing atmospheric pressure, humidity, or temperature), or the like. In certain embodiments, the applications 134 are related to the exchange of information between the electronic device 100 and external electronic devices (such as electronic device 410). The information-exchange-related application includes, for example, a notification relay application for relaying specific information to the external electronic device or a device management application for managing the external electronic device.

In certain embodiments, the notification relay application includes a function of transferring notification information created in other applications (such as the SMS or MMS application, the e-mail application, the health care application, or the environmental information application) of the electronic device 100 to external electronic device (such as the electronic device 410). In certain embodiments, the notification relay application receives notification information from, for example, an external electronic device (such as the electronic device 410) and provides the same to a user. The device management application manages (such as install, delete, or update), at least some functions (such as turning an external electronic device or some elements on or off, or adjusting the brightness or resolution of a display) of an external electronic device (such as the electronic device 410) that communicates with the electronic device 100, applications executed in an external electronic device, or services (such a phone call service or a messaging service) provided in the external electronic device.

According to various embodiments, the applications 134 include applications designated according to the properties (such as the type of electronic device) of the external electronic device (such as the electronic device 410). For example, if the external electronic device is an MP3 player, the applications 134 are related to reproduction of music. Likewise, if the external electronic device is a mobile medical device, the applications 134 are related to health care. According to certain embodiments, the application 134 includes at least one of applications designated in the electronic device 100 or applications received from external electronic devices (such as electronic device 410 or server 420).

The input/output interface 140 transfers instructions or data input by the user through input or output devices (such as sensors, keyboards, or touch screens) to the processor 120, the memory 130, the communication interface 160, or the application control module 170 through, for example, the bus 110. For example, the input/output interface 140 provides data on a user's touch input through a touch screen to the processor 120 and outputs instructions or data, which are received from the processor 120, the memory 130, the communication interface 160, or the image control module 170 through the bus 110, through the input or output devices (such as speakers or displays). For example, the input/output interface 140 outputs audio data processed by the processor 120 to the user through the speaker, so the user can hear the sound output from the speaker.

The display 150 displays various pieces of information (such as multimedia data or text data) to the user.

The communication interface 160 performs communications between the electronic device 100 and external electronic devices (such as the electronic device 410 or the server 420). For example, the communication interface 160 is connected to a network 400 through wireless communications or wired communications to thereby communicate with the external electronic device. The wireless communications includes at least one scheme of Wi-Fi, Bluetooth (BT), near field communication (NFC), a global positioning system (GPS), or cellular communication (such as LTE, LTE-A, CDMA, WCDMA, UMTS, WiBro, or GSM). The wired communications includes at least one scheme of a universal serial bus (USB), a high definition multimedia interface (HDMI), recommended standard 232 (RS-232), or a plain old telephone service (POTS). The communication interface 160 includes a wireless processing module (not shown) for performing wireless communications and a communication processor (CP) for controlling handovers and cell-reselection. According to certain embodiments of the present disclosure, in order to support wireless communication, the communication interface 160 includes a wireless processing unit (not shown) for transmitting and receiving signals of a predetermined wireless band according to the corresponding wireless communication, measuring power of a signal received from the base station (cell), and storing the measured signal power or transfer the measured signal power to an upper layer. According to certain embodiments of the present disclosure, the communication interface 160 includes a modem (not shown) or a data processor (not shown) for encoding, decoding, modulating, and demodulating signals. According to certain embodiments of the present disclosure, the modem or the data processor is replaced with the operation of the communication processor. Hereinafter, the processor that performs a control operation of a handover or cell-reselection is referred to as a "communication controller," and the element that transmits and receives signals of a predetermined wireless band according to wireless communications is referred to as a "wireless processing unit".

According to certain embodiments, the network 400 is a telecommunication network. The telecommunication networks 400 include at least one of a computer network, the Internet, the Internet of things, or a telephone network. According to certain embodiments of the present disclosure, the network 400 includes the base stations 200A, 200B, 200C, and 200D described above. According to certain embodiments, protocols (such as a transport layer protocol, a data link layer protocol, or a physical layer protocol) for communications between the electronic device 100 and external electronic devices are supported by at least one of the applications 134, the API 133, the middleware 132, the kernel 131, or the communication interface 160.

The application control module 170 processes at least some of information obtained from other elements (such as the processor 120, the memory 130, the input/output interface 140, or the communication interface 160) and provides the same to the user in various manners. For example, the application control module 170 recognizes connection component information that is provided in the electronic device 100, stores the connection component information in the memory 130, and executes the applications 134 based on the connection component information.

In certain embodiments, the processor 120 performs the operation of the communication processor (CP) that is included in the communication interface 160 in FIG. 4. In certain embodiments, the communication interface 160 does not include the communication processor. Hereinafter, the processor 120 that performs the operation of the communication processor (CP) or the communication processor is referred to as a "communication controller". The memory 130 stores data necessary for the control of the communication controller.

Figure 5:
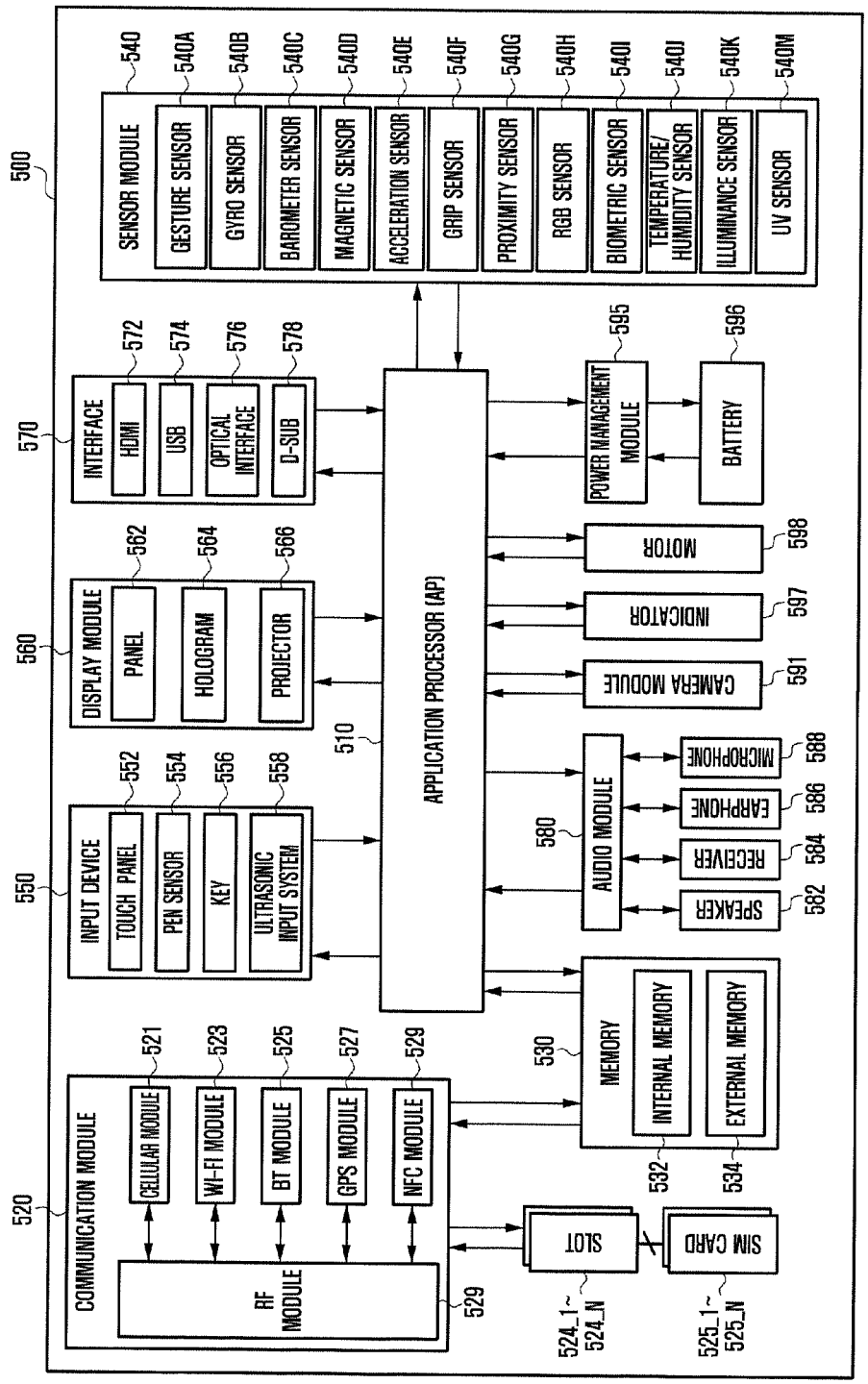
FIG. 5 illustrates a block diagram of an electronic device according to various embodiments of the present disclosure.

FIG. 5 illustrates a block diagram of an electronic device 500 according to various embodiments of the present disclosure. The electronic device 500 constitutes a part of or the entire electronic device 100 shown in FIG. 4.

Referring to FIG. 5, the electronic device 500 includes an application processor (AP) 510, a communication module 520, a subscriber identification module (SIM) card 525, a memory 530, a sensor module 540, an input device 550, a display 560, an interface 570, an audio module 580, a camera module 591, a power management module 595, a battery 596, an indicator 597, or a motor 598.

The AP 510 controls a multitude of hardware or software elements connected with the AP 510 and performs data processing and calculation using an operating system or application programs. The AP 510 is implemented by, for example, a system on chip (SoC). According to certain embodiments, the AP 510 further includes a graphic processing unit (GPU) (not shown).

The communication module 520 (such as the communication interface 160) transmits and receives data through communications between the electronic device 500 (such as the electronic device 100) and other electronic devices (such as the electronic device 410 or server 420) that are connected with the electronic device 500 through the network. According to certain embodiments of the present disclosure, the communication module 520 includes a cellular module 521, a Wi-Fi module 523, a BT module 526, a GPS module 527, an NFC module 528, a radio frequency (RF) module 529, or the like.

The cellular module 521 provides services of voice calls, video calls, text messages, or Internet services through communication networks (esuch as LTE, LTE-A, CDMA, WCDMA, UMTS, WiBro, GSM, or the like) and performs identification and authentication of the electronic device in communication networks by using subscriber identification modules (such as SIM cards 524). According to certain embodiments of the present disclosure, the cellular module 521 performs at least some of functions provided by the AP 510. For example, the cellular module 521 performs at least some of functions of controlling multimedia.

According to certain embodiments of the present disclosure, the cellular module 521 includes a communication processor (CP) and is implemented, for example, by a SoC. According to certain embodiment of the present disclosure, the cellular module 521 is regarded as a configuration including the wireless processing unit and the communication controller, which are set forth in FIG. 4. Although the elements, for example, the cellular module 521 (such as the communication processor), the memory 530, or the power management module 595, are illustrated to be separated from the AP 510, the AP 510 can include at least some (such as the cellular module 521) of the above elements according to certain embodiments of the present disclosure.

According to certain embodiments of the present disclosure, the AP 510 or the cellular module 521 (such as the communication processor) loads and processes instructions or data received from non-volatile memories or at least one of the other elements that are connected and stores data received or created from or by at least one of other elements in non-volatile memories.

Each of the Wi-Fi module 523, the BT module 526, the GPS module 527, and the NFC module 528 include, for example, a processor for processing data transmitted and received through each module. Although the cellular module 521, the Wi-Fi module 523, the BT module 526, the GPS module 527, and the NFC module 528 are illustrated to be a separate element in FIG. 5, according to certain embodiments of the present disclosure, at least some (such as two or more) of the cellular module 521, the Wi-Fi module 523, the BT module 526, the GPS module 527, or the NFC module 528 can be included in one integrated chip (IC) or one IC package. For example, at least some of the processors corresponding to the cellular module 521, the Wi-Fi module 523, the BT module 526, the GPS module 527, or the NFC module 528 (such as a communication processor corresponding to cellular module 521 and a Wi-Fi processor corresponding to Wi-Fi module 523) are implemented by a single SoC.

The RF module 529 transmits and receives data, for example, RF signals. The RF module 529 includes, although not illustrated, transceivers, power amp modules (PAM), frequency filters, low noise amplifiers (LNA), or the like, and other components, such as conductors or cables, for transmitting and receiving electromagnetic waves through the free space of wireless communications. Although FIG. 5 illustrates that the cellular module 521, the Wi-Fi module 523, the BT module 526, the GPS module 527, and the NFC module 528 share a single RF module 529, according to certain embodiments of the present disclosure, at least one of the cellular module 521, the Wi-Fi module 523, the BT module 526, the GPS module 527, or the NFC module 528 transmits and receives RF signals through separate RF modules.

The SIM cards 525_1 to 525_N are cards adopting a subscriber identification module, and are inserted into slots 524_1 to 524_N that are formed at a predetermined position of the electronic device. The SIM cards 525_1 to 525_N include inherent identification information (such as integrated circuit card identifier (ICCID)) or subscriber information (such as international mobile subscriber identity (IMSI)).

The memory 530 (such as memory 130) includes an internal memory 532 or an external memory 534. The internal memory 532 includes at least one of volatile memories (such as dynamic RAM (DRAM), static RAM (SRAM), synchronous dynamic RAM (SDRAM), or the like) or non-volatile Memories (such as a one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, or the like).

According to certain embodiments of the present disclosure, internal memory 532 is a solid-state drive (SSD). The external memory 534 further includes a flash drive, for example, a compact flash (CF), a secure digital (SD), a micro secure digital (Micro-SD), a mini secure digital (Mini-SD), an extreme digital (xD), a memory stick, or the like.

The external memory 534 is functionally or physically connected with the electronic device 500 through various interfaces. According to certain embodiments of the present disclosure, the electronic device 500 further includes a storage apparatus or a storage medium, such as hard disc drives. According to certain embodiments of the present disclosure, the internal memory 532 or the external memory 534 stores various pieces of data set forth in FIG. 4.

The sensor module 540 measures physical quantities and detects an operation state of the electronic device 500, to thereby convert the measured or detected information to electric signals. The sensor module 540 includes, for example, at least one of a gesture sensor 540A, a gyro-sensor 540B, an atmospheric or barometer sensor 540C, a magnetic sensor 540D, an acceleration sensor 540E, a grip sensor 540F, a proximity sensor 540G, a color sensor 540H (such as red-green-blue (RGB) sensor), a biometric sensor 540I, a temperature/humidity sensor 540J, an illuminance sensor 540K, or an ultra violet (UV) sensor 540M. In certain embodiments, the sensor module 540 further includes an E-nose sensor, an electromyography sensor (EMG), an electroencephalogram sensor (EEG), an electrocardiogram sensor (ECG), an infrared (IR) sensor, an iris sensor, a fingerprint sensor, or the like. The sensor module 540 further includes a control circuit (not illustrated) for controlling at least one sensor included in the sensor module 540.

The input device 550 includes a touch panel 552, a digital pen sensor 554, keys 556, or an ultrasonic input device 558. The touch panel 552 recognizes a touch input by at least one of, for example, a capacitive type, a pressure type, an infrared type, or an ultrasonic type, and includes a control circuit. In the case of a capacitive type, the proximity as well as direct touches are detected. The touch panel 552 further includes a tactile layer to provide the user with a tactile reaction.

The digital pen sensor 554 is implemented by using the identical or similar method to the user's touch or a separate recognition sheet. The keys 556 include, for example, physical buttons, optical keys, or a keypad. The ultrasonic input device 558 detects acoustic waves with a microphone (such as microphone 588) at the electronic device 500 through an input means that generates ultrasonic signals to thereby identify data. The ultrasonic input device 558 performs wireless recognition. According to certain embodiments of the present disclosure, the electronic device 500 receives user inputs from the external devices (such as computers or servers) that are connected with the communication module 520, using the communication module 520.

The display 560 (such as display 150) includes a panel 562, a hologram device 564, or a projector 566. For example, the panel 562 can be liquid crystal displays (LCD) or active matrix organic light emitting diodes (AM-OLED). The panel 562 is implemented to be, for example, flexible, transparent or wearable. The panel 562 is configured with the touch panel 552 as a single module. The hologram device 564 displays 3D images in the air by using interference of light. The projector 566 displays images by projecting light onto a screen. The screen can be positioned, for example, inside or outside the electronic device 500. According to certain embodiments, the display 560 further includes a control circuit for controlling the panel 562, the hologram device 564, or the projector 566.

The interface 570 includes, for example, a high-definition multimedia interface (HDMI) 572, a universal serial bus (UBS) 574, an optical interface 576, or a D-subminiature (D-sub) 578. The interface 570 is included in, for example, the communication interface 160 shown in FIG. 4. In certain embodiments, the interface 570 includes, for example, a mobile high-definition link (MHL) interface, a secure digital (SD) card or multi-media card (MMC) interface or an infrared data association (IrDA) standard interface.

The audio module 580 converts voices to electric signals, and vice versa. At least some elements of the audio module 580 are included in, for example, the input/output interface 140 shown in FIG. 4. The audio module 580 processes voice information input or output through, for example, a speaker 582, a receiver 584, earphones 586 or a microphone 588.

The camera module 591 is a device for photographing still or moving images and includes at least one of an image sensor (such as a front sensor or rear sensor), lenses (not illustrated), an image signal processor (ISP) (not shown), or a flash (e.g., LED or xenon lamp) (not illustrated), according to certain embodiments.

The power management module 595 manages the power of the electronic device 500. The power management module 595 includes, for example, a power management integrated circuit (PMIC), a charger integrated circuit (IC), a battery, or a fuel gauge.

The PMIC is mounted, for example, in integrated circuits or SoC semiconductors. The PMIC can be divided into a wired type and a wireless type. The charger IC charges the battery and prevents flows of excessive voltages or excessive currents from the charger. According to certain embodiments of the present disclosure, the charger IC includes a charger IC for at least one of the wired charging type or the wireless charging type. The wireless charging type encompasses, for example, a magnetic resonance type, a magnetic induction type or an electromagnetic wave type, and additional circuits for wireless charging, for example, coil loops, resonance circuits, rectifiers, or the like.

The battery gauge measures, for example, the remaining amount of battery 596, a charging voltage and current, or temperature. The battery 596 stores or creates electric power to be supplied to the electronic device 500. The battery 596 includes, for example, a rechargeable battery or a solar battery.

The indicator 597 displays a specific state, for example, a booting state, a message state, or a charging state of the whole or a part (such as the AP 510) of the electronic device 500. The motor 598 converts electric signals to a mechanical vibration. Although not illustrated, the electronic device 500 can include a processing device (such as a GPU) for supporting mobile TV. The processing device for supporting mobile TV processes media data according to standards, for example, a digital multimedia broadcasting (DMB), a digital video broadcasting (DVB), or a media flow.

Each of the above-described elements of the electronic device according to the present disclosure can include one or more components, and the name of the relevant element can change depending on the type of electronic device. The electronic device according to the present disclosure can include at least one of the above-described elements. Some of the above-described elements can be omitted from the electronic device, or the electronic device can further include additional elements. Also, some of the elements of the electronic device according to the present disclosure can be combined into one entity, which can perform functions identical to those of the relevant elements before the combination.

The term "module" used in the present disclosure refers to, for example, a unit including one or more combinations of hardware, software, and firmware. The "module" can be interchangeably used with a term, such as unit, logic, logical block, component, or circuit. The "module" can be the smallest unit of an integrated component or a part thereof. The "module" can be the smallest unit that performs one or more functions or a part thereof. The "module" can be mechanically or electronically implemented. For example, the "module" according to certain embodiments of the present disclosure can include at least one of an Application-Specific Integrated Circuit (ASIC) chip, a Field-Programmable Gate Arrays (FPGA), and a programmable-logic device for performing operations, which has been known or are to be developed hereinafter.

Figure 6:
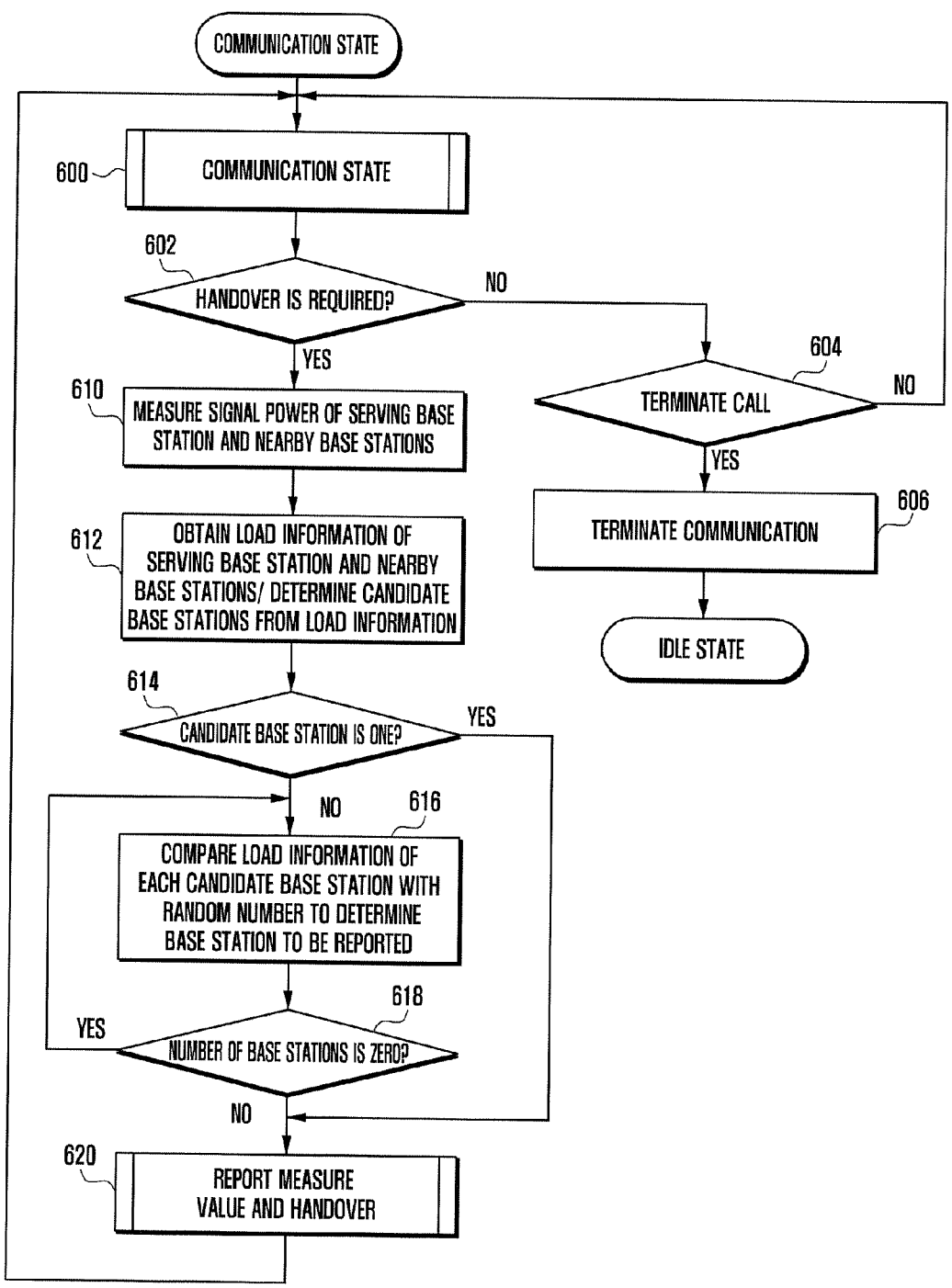
FIG. 6 illustrates a process for control of performing a handover in an electronic device according to various embodiments of the present disclosure.

FIG. 6 illustrates a process for control of performing a handover in an electronic device according to various embodiments of the present disclosure. In the following description about FIG. 6, the internal configuration of the electronic device will be described with reference to FIG. 4 as set forth above. The description can be applied to any electronic device that provides wireless communication services according to the various embodiments of the present disclosure, as well as to the configurations in FIGS. 4 and 5. In certain embodiments, the operation of the communication state or the idle state is performed by the communication controller and the wireless processing units.

FIG. 6 illustrates a control flowchart in the communication state. In certain embodiments, the communication state encompasses voice communications and data communications. For example, in the case of the voice communications, a specific wireless resource is allotted from a serving base station to thereby transmit and receive voice data. In the case of the data communications, a specific wireless resource is allotted from a serving base station to thereby transmit and receive data other than the voice data. Therefore, in the communication state, operations of controlling transmission power, modulating and demodulating, and encoding and decoding are performed continuously or intermittently during transmission and reception of data.

In operation 600, the communication controller maintains the communication state, and can proceed to operation 602 to thereby determine whether or not the handover is necessary. The communication controller determines whether or not the handover is necessary based on the reference signal received power (RSRP) that is received from a serving base station (such as a serving node B or serving enhanced node B).

More specifically, the communication controller receives biasing offset information from the base station before communications or during communications. In certain embodiments, a biasing offset value is configured to be different according to each system. The basing offset value refers to a minimum power value or minimum signal power that can be received by the electronic device in the base station boundary area in order to inform the area where the communication connection can be made. The critical value to be transmitted to inform the boundary between the base stations is the biasing offset value. Accordingly, the electronic device recognizes a normal base station node and a low power base station node using the biasing offset value. For example, a large biasing offset value denotes a normal base station node that has a large radius-cell and a small biasing offset value denotes a low power base station node that has a small radius-cell.

As describe above concerning operation 602, the received biasing offset information is a reference value by which the handover of the electronic device is determined, which the communication controller compares the reference signal received power (RSRP) with pre-stored reference base station signal power during communications in. If the reference signal received power (RSRP) is less than the pre-stored reference base station signal power in operation 602, the communication controller determines that the handover is necessary. When the handover is necessary as a result of checking 602, the communication controller proceeds to operation 610. Otherwise, the communication controller proceeds to operation 604.

In operation 604, the communication controller determines whether a request for ending a call is received. If the request for ending a call is received as a result of the determination in operation 604, the communication controller proceeds to operation 606 and performs a call ending procedure with the base station through the wireless processing unit. If the request for ending a call is not received, the communication controller returns to operation 600 to thereby maintain the communication state.

In operation 610, when it is determined that the handover is necessary in operation 602, the communication controller measures the signal power of the serving base station and the nearby base stations. The signal power of the serving base station can be preliminarily measured, for example, the signal power of the base station, which has been measured in operation 602 to determine the handover, is used. According to certain embodiments of the present disclosure, the signal power of the serving base station is measured after operation 602.

Like the serving base station, the measurement of signal power of the nearby base stations can be conducted by detecting the reference signal received power (RSRP) received from the base stations. The electronic device determines whether or not the handover is necessary, and at the same time, measures the signal power received from the nearby base stations. The electronic device uses the information of the reference signal received quality (RSRQ) that includes information of the received signal strength indicator (RSSI) considering all the received signals in the measurable bandwidth (BW) This allowing the electronic device, which is not positioned in the boundary area of the base station, to identify the cell boundary. For example, when a nearby base station having a strong signal power exists even with the high power of the serving base station, the electronic device measures the reference signal received quality (RSRQ) information that includes the received signal strength indicator (RSSI) considering all the received signals in the measurable bandwidth (BW) in order to determine whether or not the electronic device is positioned at the boundary area of the base station. If the measured reference signal received quality (RSRQ) for the serving base station is less than a predetermined critical value, the electronic device recognizes the existence of the nearby base station that uses the same channel.

In operation 612, the communication controller obtains load information of the nearby base stations as well as the serving base station. For example, in the case of a wireless communication system of LTE, the communication controller obtains the current load information and the optimum load information, which are included in SIB Type 2 information. For example, in the case of a wireless communication system of Wi-Fi, the communication controller obtains the current load information and the optimum load information, which are included in beacon signals. Such load information includes the current load information according to Equation 1 described in FIG. 3, which is broadcast over the base station area every predetermined unit time, continuously, or irregularly.

The communication controller determines candidate base stations from the load information (such as current load information and optimum load information of base station) obtained in operation 612. The communication controller determines the base stations, which have signal power greater than the signal power received from the serving base station, to be the first candidate base stations. When the electronic device traces the change of signal power for a predetermined time, the decrease in signal power of the serving base station and the increase in signal power of the nearby base station are considered together. The first criterion for determining the candidate base stations by the communication controller are the reference signal received power (RSRP) from the serving base station and the reference signal received power (RSRP) from the nearby base stations. Hereinafter, the candidate base stations that are determined based on the reference signal received power (RSRP) are referred to as "the first candidate base stations", which are determined based on the reference signal received quality (RSRQ) as well as set forth above. The first candidate base station refers to the base station that is determined based on the reference signal received power (RSRP) or the reference signal received quality (RSRQ) in the present description.

According to various embodiments of the present disclosure, the criterion for the second candidate base stations is based on a load rate of the base station. For example, if two or more base stations satisfy the first criterion, the load rates of two or more base stations are checked. Provided that the optimum load rate of a specific base station is 100%, the current load rate of the corresponding base station can be, for example, 20% and 80%. In certain embodiments, the determination of the base station for a handover based on only the reference signal received power (RSRP) and the reference signal received quality (RSRQ), which are received from the base station, do not reflect the load rate of the specific base station.

According to various embodiments of the present disclosure, the first candidate base stations that satisfy a predetermined load reference can be determined as the second candidate base stations. For example, if the predetermined first load reference is 50%, the base stations that have a current load rate less than 50% are determined as the second candidate base stations. The first load reference can be changed, for example, into 65% or 40%, or the second load reference can have different values such as 65% or 40%. Now, the change of the first load reference or provision of the second load reference will be described.

In some embodiments, no base station can satisfy the first load reference. For example, if there is not any base station that has a load rate less than 50%, for example, the first load reference, the second load reference or the first load reference can be changed. For the convenience of explanation, the following description will be made about the second load reference.

The second load reference is a load reference that has been changed by a predetermined method. For example, the changing method of the second load reference is configured as a specific value or determined in consideration of the load rates of the serving base station and the nearby base stations. In certain embodiments, the first load reference and the second load reference can be configured as specific values, i.e., 50% and 65%, respectively, as described above.

In certain embodiments, the minimum load rate among those of the serving base station and the nearby base stations are determined as the first load reference. If the serving base station has the minimum load rate and the handover is necessary, the minimum load rate of the nearby base stations are configured as the second load reference.

According to various embodiments of the present disclosure, specific values and the load rate are considered together. For example, if the first load reference is configured as a specific value and the load rates of all the base stations exceed the first load reference, the second load reference or the third load reference is determined by the load rates of the serving base station and the nearby base stations.

According to various embodiments of the present disclosure, some of the nearby base stations are preliminary configured with a load rate value by which the handover is impossible. For example, if some base stations have a pre-configured load rate, such as 85% or 90%, the handover with respect to the corresponding base stations can be impossible, and the user can be informed of a handover-impossible state in advance by an alarm.

The communication controller determines the second candidate base station by one or more embodiments described above in operation 612. In operation 614, after the second candidate base station is determined, the communication controller checks the number of the second candidate base stations. If the number of the second candidate base stations is zero, then there is not a second candidate base station or the handover is impossible. Therefore, the number of the second candidate base stations is one or more.

As a result of checking in operation 614, if the number of the second candidate base stations is two or more, the communication controller proceeds to 616, and if the number of the second candidate base stations is only one, the communication controller proceeds to operation 620. The following description will be made about two or more of the second candidate base stations.

In operation 616, the communication controller determines the base station to which the received signal power is reported in a probability method. The report of a probability method is performed in various ways in operation 616, for example, the base stations are mapped to create "0" and "1" in a probability method and only the base stations corresponding to "1" are determined as the base stations to be reported. "0" and "1" are created in a probability method according to the load state of the base station. For example, in the case in which "1" is randomly created and the measured signal is reported to the base station for the handover, when the load of the base station is low, the creation probability of "1" is increased, and when the load of the base station is high, the creation probability of "0" is increased. In certain embodiments, in the case in which "0" is randomly created and the measured signal is reported to the base station for the handover, when the load of the base station is low, the creation probability of "0" is increased, and when the load of the base station is high, the creation probability of "1" is increased.

According to various embodiments of the present disclosure, the load information of the second candidate base stations is utilized. For example, a random number between "0" and "1" is created and the created random number are compared with the load information of the second candidate base stations to thereby determine the base station to which the signal power received from the base station is reported. In certain embodiments, random numbers between "0" and "1" are created and mapped with the second candidate base stations. The current load information of the second candidate base stations is compared with the created random numbers to thereby determine the base station to which the signal power received from the base station is reported. The signal power of the base station are reported with a high probability at low load and reported with a low probability at high load.

According to certain embodiments, the determination of the second candidate base stations according to the load state of the base stations reduces excessive reports to the base stations, and enables the handovers of a high probability with respect to the base stations in a relatively low load state, to thereby prevent handovers of all of the terminals from concentrating on the base station in the low load state.

In operation 616, the communication controller reports the signal power to all of or some of the second candidate base stations. For example, the communication controller reports the signal power to the base stations that have been determined to be reported by comparing the crated random number with the current load rate of the base station. The operation of determining the base station to which the signal power is to be reported by random numbers allows the target base stations to which the handover is made to be determined in a probability method.

In operation 618, the communication controller checks whether the number of the base stations to be reported for the received signal power is zero. When the number of the base stations to be reported for the received signal power is zero, the communication controller returns to operation 616. In certain embodiments, when the number of the base stations to be reported for the received signal power is zero, the handover cannot be performed.

In operation 616, the received signal power of the second candidate base stations is reported in the probability method among the second candidate base stations so that the size of a report message of the received signal power, which is reported from the electronic device to the base station, or the number of thereof can be reduced. For example, in the case of five base stations, the signal power of five base stations is reported. According to various embodiments of the present disclosure, the signal power is reported to a small number of base stations, such as three, four, or five base stations, in the probability method, so the size of the report message can be reduced.

In certain embodiments, when two or more nearby base stations are capable of performing a handover, the load is effectively distributed through the report of the probability method. For example, when the load of a specific base station is low, it is highly probable to report the signal power received from the base station having a low load. As a result, it is highly probable that the handover is performed with respect to the base station having a low load. When there are two or more base stations, which have the similar signal power or which are able to perform handovers, the handover is made to the base station having a low load in probability, so the concentration of the load on a specific base station is prevented.

If the number of the base stations to be reported for the signal power is one or more, the communication controller proceeds to operation 620. As described above, when the number of the candidate base stations is one in 614, the communication controller proceeds to operation 620 as well. In 620, the communication controller provides the measured signal power value of the corresponding base station and a request signal for a handover to the serving base station. The communication controller performs a handover to a specific base station under the control of the serving base station.

According to various embodiments of the present disclosure, some of the operations in FIG. 6 can be modified. For example, although the random number is created to thereby select the second candidate base stations in order to select some of the first candidate base stations in FIG. 6, the information on the signal power received from the first candidate base stations can be directly reported without creation of the random numbers. In certain embodiments, since the base stations capable of performing a handover have already been determined based on the load information of the base stations, the handover can be performed according to the load rate of the base station.

In certain embodiments, when the handover is necessary and the report is made according to the load rate or the received signal power, the electronic device gives priority to the base stations according to the load rate, the signal power, or both of them, and reports to the base stations in order of priority. According to certain embodiments, the base station determines the target base station to be performed with the handover according to the priority.

The operation of the handover described above can be more effective to a system including normal base station nodes and low power base station nodes. For example, the normal base station node includes a cell area greater than that of a low power base station node, because the normal base station node can transmit signals of a higher power than the low power base station node. The handover method according to various embodiments of the present disclosure, prevents excessive handovers when a number of base stations are close to each other. According to various embodiments of the present disclosure, the handover method reduces the size of the report message to the base station for the handover to thereby reduce interferences by the report message. For example, the target base station for the handover is determined in the probability method according to the load state of the base stations to thereby reduce the amount of information on the report of the measured signal power or quality.

Figure 7:
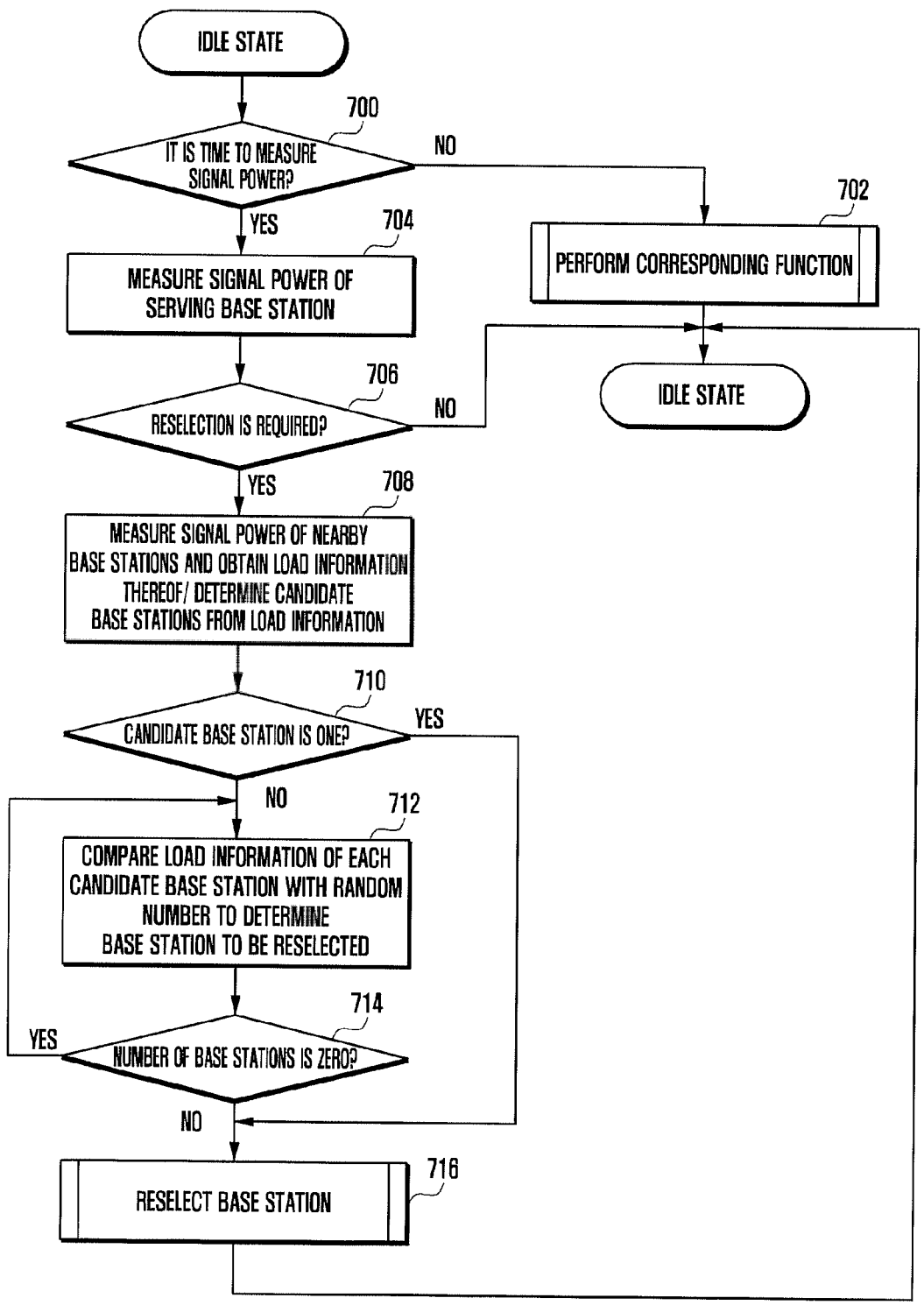
FIG. 7 illustrates a process for control of performing cell-reselection in an electronic device according to various embodiments of the present disclosure.

FIG. 7 illustrates a process for control of performing cell-reselection in an electronic device according to various embodiments of the present disclosure. In the following description about FIG. 7, the internal configuration of the electronic device is described with reference to FIG. 4 as set forth above. The description can be applied to any electronic device that can provide wireless communication services according to the various embodiments of the present disclosure, as well as to the configurations of FIGS. 4 and 5. In certain embodiments, the operation of the idle state is performed by the communication controller and the wireless processing units.

FIG. 7 illustrates a control flowchart illustrating a re-connection of the cell or the base station in the idle state. In certain embodiments, the idle state refers to the state in which the electronic device is connected with the base station but communication is not in progress. In certain embodiments, the idle state means the state in which the electronic device is waiting for specific events such as a request for communication by the user, reception of a signal from the base station due to an incoming call, or a request for executing functions provided in the electronic device. In the idle state, the electronic device measures the signal power received from the base station periodically or continuously according to the communication method and reselects the cell or the base station. The following description will be made in the case of a wireless communication method in which the signal power is periodically measured.

In operation 700, when a specific event is received in the idle state, the communication controller checks whether or not it is time to measure the signal power by a predetermined time unit according to the current event, when it is time to measure the signal power as a result of checking in operation 700, the communication controller proceeds to operation 704. Otherwise, the communication controller proceeds to operation 702 to thereby perform the corresponding function and return to the idle state. In certain embodiments, the corresponding function is outgoing calls of the user, a request for communication from the base station due to incoming calls, or a request for performing functions provided in the electronic device.

In operation 704, the communication controller controls the wireless processing unit to measure the signal power of the base station that is currently connected with the electronic device. The signal power of the currently connected base station is measured by the reference signal received power (RSRP) received from the corresponding base station, as described in FIG. 6. In certain embodiments, the signal power of the currently connected base station is measured by the reference signal received quality (RSRQ) including the received signal strength indicator (RSSI). In certain embodiments, the electronic device obtains the current load information of the currently connected base station, as set forth in FIG. 6.

In operation 708, the communication controller obtains the signal power and the load information of the nearby base stations. The measurement of the signal power of the nearby base stations is conducted by the same method as the method by which the signal power of the currently connected base station is measured, and the communication controller obtains the load information from the nearby base stations in operation 708. For example, in an LTE wireless communication system, the communication controller obtains the current load information and the optimum load information of the base station, which is included in SIB Type 2 information. In a Wi-Fi wireless communication system, the communication controller obtains the current load information and the optimum load information, which is included in the beacon signals. If the electronic device does not obtain the current load information of the currently connected base station in operation 704, the electronic device obtains the current load information of the currently connected base station in operation 708.

After the load information of the nearby base stations is obtained, the communication controller determines candidate base stations based on the obtained load information. The candidate base stations for cell-reselection are determined by the same method as the method by which the second candidate base stations are determined in FIG. 6 and one or more of the second candidate base stations are determined. If none of the second candidate base station is determined, although not illustrated in FIG. 7, the cell reselection is stopped.

In operation 710, to the communication controller checks the number of the candidate base stations. When there is only one candidate base station, the communication controller proceeds to operation 716, and when there are two or more candidate base stations, the communication controller proceeds to operation 712.

In operation 712, the communication controller creates a random number and determines the base station to be reselected in a probability method using the created random number and the load information of the candidate base stations. The base station to be reselected in a probability method is determined by the same method as the method by which the base station to which the received signal power information is to be transmitted in FIG. 6. In certain embodiments, only one base station is determined as the base station to be re-selected. The routine set forth above can be repeated until one base station is determined or the base station having the highest priority is selected. For example, when two or more base stations are selected as the second candidate base stations for the cell-reselection, since the previous state is the same, the base station including the highest received signal power is selected or the base station of the lowest load is selected. The base station including the highest received signal power or the base station of the lowest load is selected as the base stations for the cell reselection.

In operation 714, the communications controller checks whether or not the number of the base stations is zero, referring to when there is not the second candidate base station to be selected by the random numbers. According to various embodiments of the present disclosure, operation 712 can be repeated to find at least one of the second candidate base stations. According to certain embodiments of the present disclosure, when the number of the base stations is zero as a result of checking in operation 714, the reselection of the base station is terminated.

When the base station for reselection is determined as describe above, the communication controller creates a request message for a connection and transmits the same to the corresponding base station. For example, in the LTE communication system, the request message for the connection is a radio resource control (RRC) connection request message.

According to various embodiments of the present disclosure, some of the operations in FIG. 7 can be modified. For example, although the random number is created in order to select some of the first candidate base stations, and the second candidate base stations are selected using the same in FIG. 7, since the base stations are determined based on the signal power information and the load information, which is received from the first candidate base stations, the base station can be reselected according the load rate of the base stations without creation of the random numbers.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing a handover in an electronic device of a wireless communication system, the method comprising:
when a handover is required, measuring a power of signals received from a serving base station and nearby base stations, and obtaining load information of the serving base station and the nearby base stations;
selecting a first candidate set for a base station capable of performing a handover, using the measured power of the received signals;
selecting second candidate set for a base station by comparing a reference load value with load information of a base station in the first candidate set;
creating random numbers for each base station in a second candidate set, if two or more base station exist in the second candidate set;
comparing the random numbers created for each base station in the second candidate set to thereby select or re-select the second candidate set;
re-selecting the second candidate set by changing the reference load value, if a base station does not exist in the second candidate set; and
transmitting information on the power of signals received from the selected second candidate set or the re-selected second candidate set and a request message for a handover to the serving base station.

2. The method of claim 1, further comprising, if no base station in the second candidate set is selected by a comparison of the random number exists, stopping an operation of the handover.

3. The method of claim 1, further comprising repeating an operation of:
if no base station in the second candidate set selected by a comparison of the random number exist, re-creating random numbers for each of the second candidate set; and
comparing the random numbers created for each of the second candidate set with the load information of each of the second candidate set to thereby reselect the second candidate set.

4. The method of claim 1, further comprising:
if two or more base station in the second candidate set exist, giving priority to the two or more base stations in the second candidate set, based on current load information or power information of signals received from the two or more base stations in the second candidate set; and
in creating the power information of the received signals to be transmitted to the serving base station, creating information on the second candidate set according to the priority.

5. The method of claim 1, wherein the load information comprises information on a total acceptable capacity of the base station and information on a currently occupied load rate.

6. The method of claim 1, wherein the load information is obtained by one of or a combination of a number of electronic devices that are capable of being accepted by the base station, an amount of traffic, a number of channels that are capable of being allotted, or an amount of the power that is capable of being allotted.

7. A method for reselecting a base station in an electronic device of a wireless communication system, the method comprising:
when reselection of the base station is required, measuring a power of signals received from nearby base stations, and obtaining load information of the nearby base stations;
selecting a first candidate set for a base station capable of being reselected, using the measured power of the received signals;
selecting a second candidate set for a base station by comparing a reference load value with load information of a base station in the first candidate set;
creating random numbers for each base station in a second candidate set, if two or more base stations exist in the second candidate set; and
comparing the random numbers created for each of the second candidate set to thereby select one base station capable of being reselected;
re-selecting the second candidate set by changing the reference load value, if a base station does not exist in the second candidate set; and
transmitting a connection signal to the selected second candidate set or the re-selected second candidate set to thereby reselect the base stations.

8. The method of claim 7, wherein the load information comprises information on a total acceptable capacity of the base station and information on a currently occupied load rate.

9. The method of claim 7, wherein the load information is obtained by one of or a combination of a number of electronic devices that are capable of being accepted by the base station, an amount of traffic, a number of channels that are capable of being allotted, or an amount of the power that is capable of being allotted.

10. An electronic device comprising:
a wireless processing unit configured to transmit and receive a signal of a predetermined communication band to and from a base station, and measures a power of a signal received from the base station;
a memory configured to store system information including the measured power of the signals and load information of the base station; and
a communication controller configured to,
when a handover is required during communications with a serving base station, control the wireless processing unit to measure power of signals received from nearby base stations,
obtain load information of the nearby base stations,
select a first candidate set for a base station capable of performing a handover, using the measured power of the received signals,
select a second candidate set for a base station by comparing a reference load value with load information of the base station in the first candidate set,
create random numbers for each base station in a second candidate set, if two or more base stations exist in the second candidate set, and
compare the random numbers created for each of the second candidate set to thereby select or re-select the second candidate set;
re-select the second candidate set by changing the reference load value, if a base station does not exist in the second candidate set,
create power information of signals received from the second candidate set and a request message for a handover, and
transmit the created power information of signals received from the selected second candidate set or the re-selected second candidate set and the request message for a handover to the serving base station.

11. The electronic device of claim 10, wherein, if no base station in the second candidate set is selected by a comparison with the random number exists, the communication controller is configured to stop an operation of the handover.

12. The electronic device of claim 10, wherein the communication controller is configured to repeat an operation of:
if no base station in the second candidate set selected by a comparison of the random number exists, re-creating random numbers for each of the first candidate set; and
comparing the random numbers created for each of the second candidate set with the load information of each of the second candidate set to thereby reselect the second candidate set.

13. The electronic device of claim 10, wherein the communication controller is configured to
if two or more base stations in the second candidate set exist, give priority to the two or more base stations in the second candidate set, based on current load information or power information of signals received from the base stations in the second candidate set, and
in creating the power information of the received signals to be transmitted to the serving base station, create information on the second candidate set according to the priority.

14. The electronic device of claim 10, wherein the load information comprises information on a total acceptable capacity of the base station and information on a currently occupied load rate.

15. The electronic device of claim 10, wherein the load information is obtained by one of or a combination of a number of electronic devices that are capable of being accepted by the base station, an amount of traffic, a number of channels that are capable of being allotted, or an amount of the power that is capable of being allotted.

16. The electronic device of claim 10, wherein the communication controller is configured to
when reselection of the base station is required, measure the power of signals received from nearby base stations,
obtain load information of the nearby base stations,
select the first candidate set capable of being reselected, using the measured power of the received signals,
select the second candidate set for base stations by comparing the reference load value with load information of a base station in the first candidate set,
re-select the second candidate set by changing the reference load value, if a base station does not exist in the second candidate set, and
control the wireless processing unit to transmit a connection signal to the selected base stations.

17. The electronic device of claim 16, wherein the communication controller is configured to:
create random numbers for each base station in the second candidate set, if two or more base station exist in the second candidate set, and
compare the random numbers created for each of the second candidate set to thereby select one base station capable of being reselected.

* * * * *